(12) United States Patent
Chen

(10) Patent No.: US 7,338,031 B2
(45) Date of Patent: Mar. 4, 2008

(54) FAUCET STRUCTURE WITH AUTOMATIC COLD-WATER RESUMING FUNCTION

(76) Inventor: Mei-Li Chen, No. 1-2, Lane 73, Sec. 2, Jhongshan Rd., Tanzih Township, Taichung County (TW)

(*) Notice: Subject to any disclaimer, the term of this patent is extended or adjusted under 35 U.S.C. 154(b) by 154 days.

(21) Appl. No.: 11/412,245

(22) Filed: Apr. 27, 2006

(65) Prior Publication Data
US 2007/0251587 A1 Nov. 1, 2007

(51) Int. Cl.
*F16K 3/00* (2006.01)
(52) U.S. Cl. ....................................... 251/313
(58) Field of Classification Search ............ 137/625.4, 137/625.41; 251/313
See application file for complete search history.

(56) References Cited

U.S. PATENT DOCUMENTS

| 4,092,085 A | * | 5/1978 | McMaster-Christie | 417/44.1 |
| 7,213,614 B2 | * | 5/2007 | Chen | 137/625.4 |
| 7,264,016 B2 | * | 9/2007 | Molina et al. | 137/454.6 |

* cited by examiner

*Primary Examiner*—John Fox
(74) *Attorney, Agent, or Firm*—Egbert Law Offices

(57) ABSTRACT

The present invention provides an improved faucet structure with cold-water resuming device, which is placed at the top of the faucet valve body and has an action component and an elastic component. The action component is connected with the elastic component via a connecting part on the valve base, which is fitted in a bore on a holder at the top of the faucet body. Therefore, the structure could be simple and small-sized, achieving the economic benefits of cost reduction and long durability.

4 Claims, 4 Drawing Sheets

FAUCET STRUCTURE WITH AUTOMATIC COLD-WATER RESUMING FUNCTION

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates generally to an improved faucet structure with an automatic cold-water resuming function, and more particularly to a device which makes use of the interaction between the valve stem and a flexible device.

BACKGROUND OF THE INVENTION

When turned off at the hot water position, a common faucet would not automatically resume the cold-water position, which, as it is turned on again, may result in the waste of gas and serious scald by elders or children.

Therefore, an improved faucet is provided herein, which, by the strength of a limiting valve (installed at the top of the faucet body) and a cold-water resuming device, can resume the cold-water position as it is turned off at the mixed water position or hot water position, and keep the faucet at the cold-water position to save energy and protect people from potential dangers.

As the valve stem and its base turn together (i.e. turn to the hot water position), a bore on the ringed piece and a sleeve bore will respectively fit into the block of the spring device and the linkage pole, accumulating the force that would bring the valve stem and its base back to their positions. However, the positioning block in this device is a ringed slice, which is thin and easy to break, especially when it is made from plastic injection material. If such devices are made of metal material, the cost would be dramatically increased and the mechanical stress would bring about deformation, resulting in undesirable action.

Thus, to overcome the aforementioned problems of the prior art, it would be an advancement in the art to provide an improved structure that can significantly improve the efficacy.

To this end, the inventor has provided the present invention of practicability after deliberate design and evaluation based on years of experience in the production, development and design of related products.

BRIEF SUMMARY OF THE INVENTION

The improvements of the invention include:
1. With the block action component 10 and the connection between the outer connecting end 11 12 with the connecting part 31 of the valve stem base 30 and the action end 21 of the elastic component 20, the proposed structure is simple and small-sized, easy to be manufactured from plastic or metal materials. Therefore, the cost and process can be greatly reduced.
2. The structural strength can also be greatly increased, making the invention more durable.

Although the invention has been explained in relation to its preferred embodiment, it is to be understood that many other possible modifications and variations can be made without departing from the spirit and scope of the invention as hereinafter claimed.

DETAILED DESCRIPTION OF THE INVENTION

The features and the advantages of the present invention will be more readily understood upon a thoughtful deliberation of the following detailed description of a preferred embodiment of the present invention with reference to the accompanying drawings.

Figure 1:
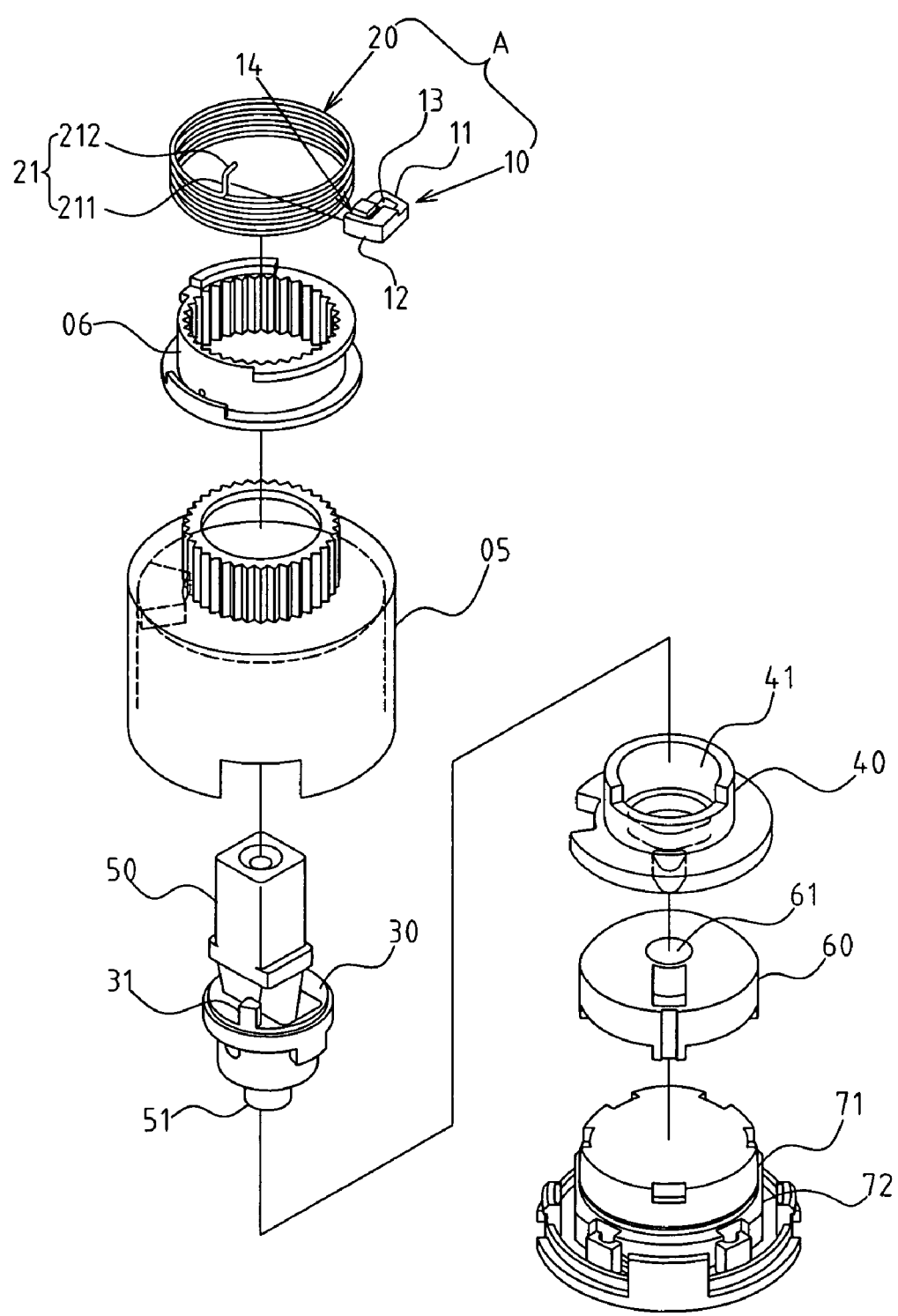
FIG. 1 shows an exploded perspective view of the present invention.
Figure 2:
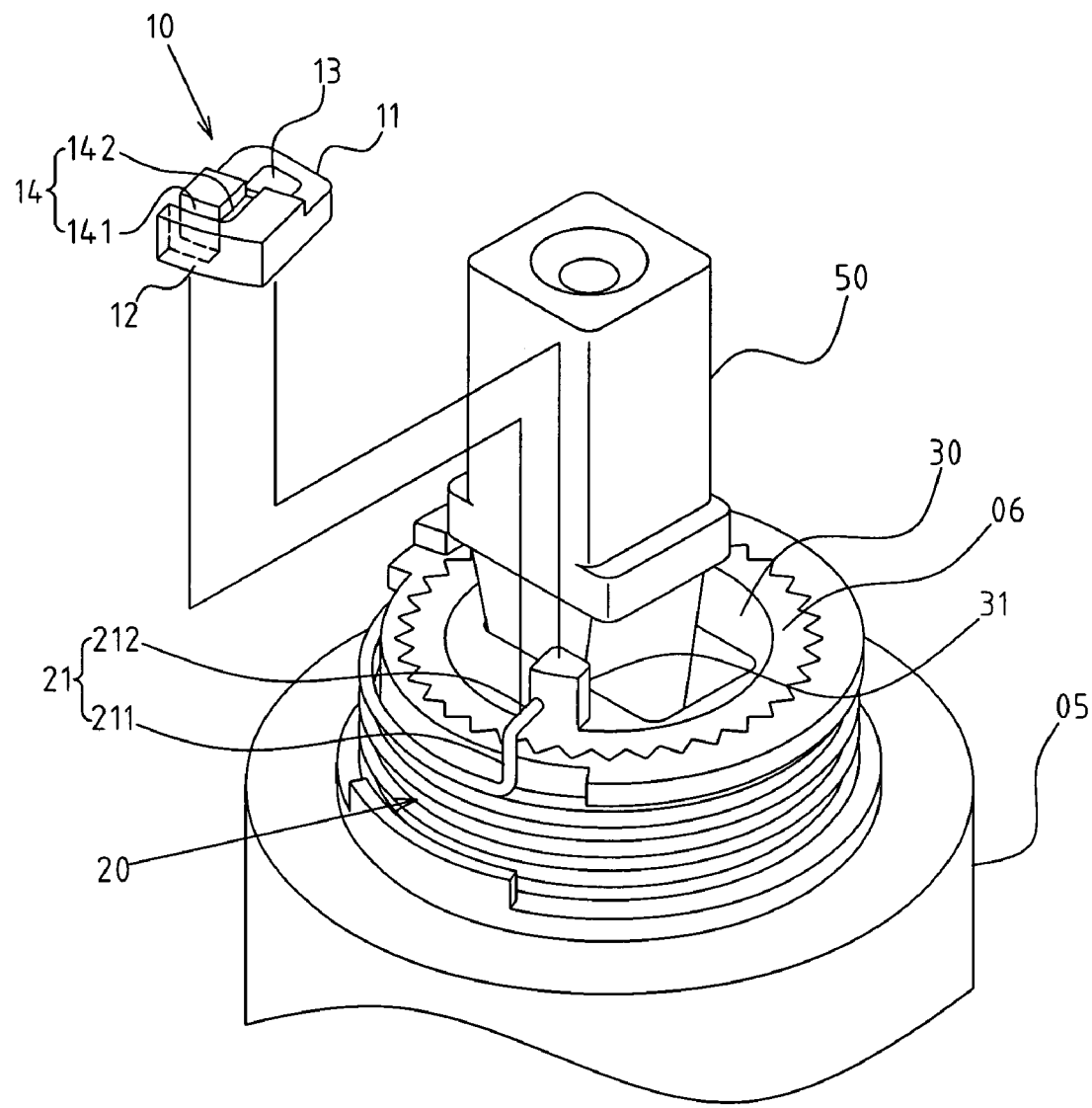
FIG. 2 shows an exploded perspective view of the action component, valve stem, and elastic component of the present invention.

As shown in FIGS. 1 and 2, an improved structure of the faucet cold-water resuming device (only for demonstration and not bound by the patent), includes a cold-water resuming device (A), which is placed at the top of the faucet body 05 and includes an action component 10 and an elastic component 20. The action component 10 is connected with the elastic component 20 via a connecting part 31 on the valve base 30, which 30 is fitted in a bore 41 on a holder 40 at the top of the faucet body 05. The valve stem base is matched with a valve stem 50, which at the bottom has a toggle 51, by which the valve stem 50 can fit into the bore 61 at the top of the whole control valve 60 in the faucet body 05. Thus, it can act with the upper control valve 71 and the lower control valve 72 to control the water temperature. The elastic component is fitted in the outer ring 06 at the top of the faucet body 05. The improvement of this invention lies in that the action component is a block that has an inner connecting end 11 and an outer connecting end 12. The inner connecting end 11 has a fitting part 13, which connects with the connecting part 31 of the valve stem base 30, while the outer connecting end 12 has a positioning slot 14 corresponding with the action end 21 of the elastic component.

The valve stem base 30 has a bulging pole, which fits with the fitting part 13 of the inner connecting end 11 of the action component 10.

The connecting part 31 of the valve stem base 30 works together with the fitting part 13 of the action component 10 as revealed in this example (see FIG. 2 for details). Therefore, the connecting part 31 of the valve stem base 30 is in the shape of quadrangle (each facet of the quadrangle is a direction facet). The fitting part 13 of the action component 10 is, accordingly, forms a quadrangle slot (the four inner walls of the quadrangle slot are corresponding direction facets). So as the fitting part 13 of the action component 10 fits into the connecting part 31 of the valve stem base 30, the action component 10 will be fixed.

The positioning slot 14 on the outer connecting end 12 of the action component 10 may have a slot part 141 and an insert part 142. The slot part 141 is horizontally cut on the action component 10, and the insert part 142 is set at the top of the action component 10 and connected with the slot part 142 at one end. Therefore, the action end of the elastic component 20 is in the shape of reverse L, with a vertical section 211 and a horizontal section 212. The vertical section 211 can fit into the slot part 141 of the positioning slot 14 while the horizontal section 212 can fit into the insert part 142 of the positioning slot 14 of the action component 10.

In light of the above-mentioned structure, the improvement of the cold-water resuming structure mainly lies in the action component 10.

Figure 3:
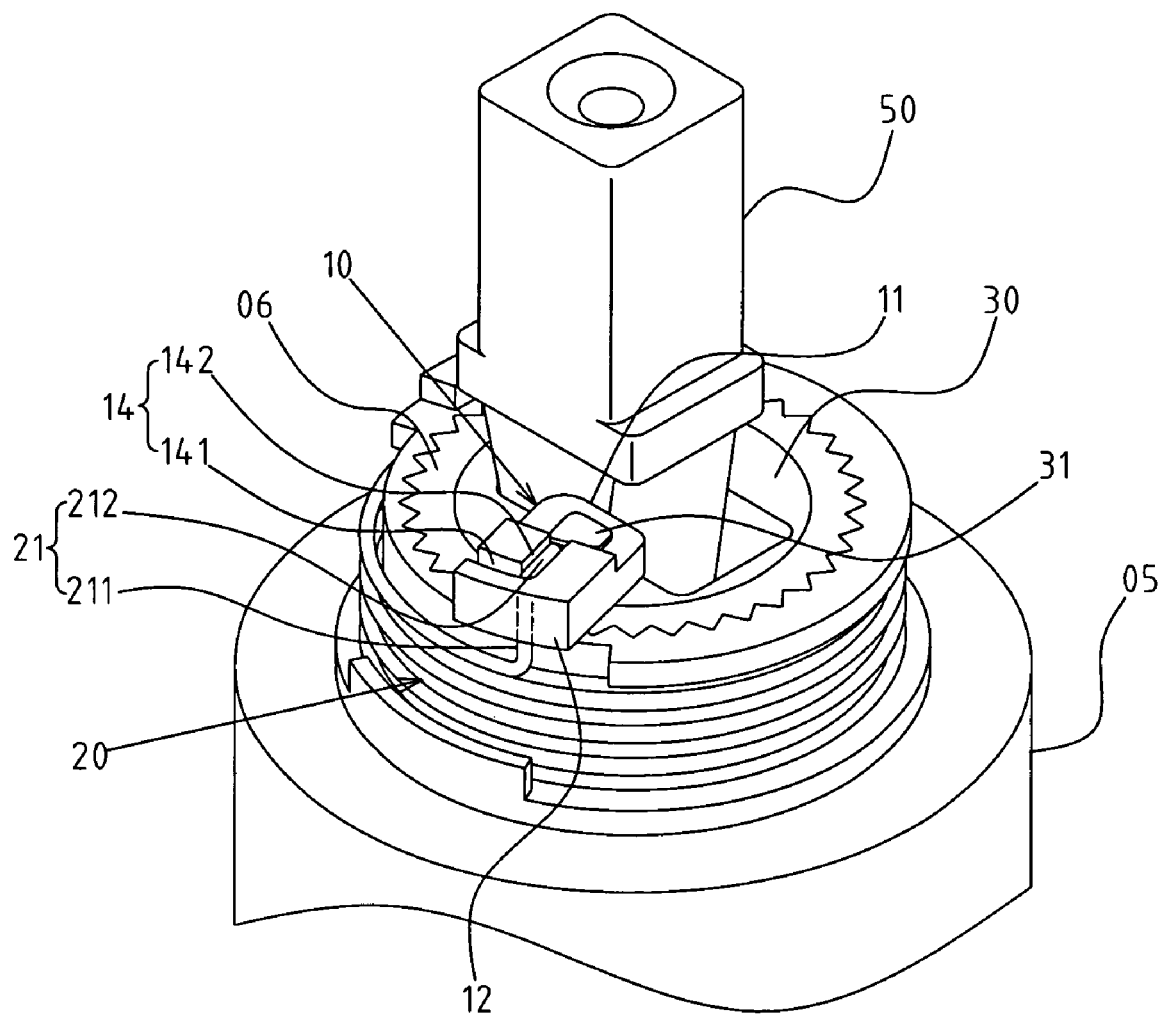
FIG. 3 shows an assembled perspective view of the action component, valve stem, and elastic component of the present invention.

The assembly of the action component 10 is revealed in FIGS. 2 and 3. The inner connecting end 11 of the action component 10 can fit into the connecting part 31 of the valve stem base 30 via the fitting part 11, and the positioning slot 14 of the outer connecting part 12 can connect with the action end 21 of the elastic component 20.

Figure 4:
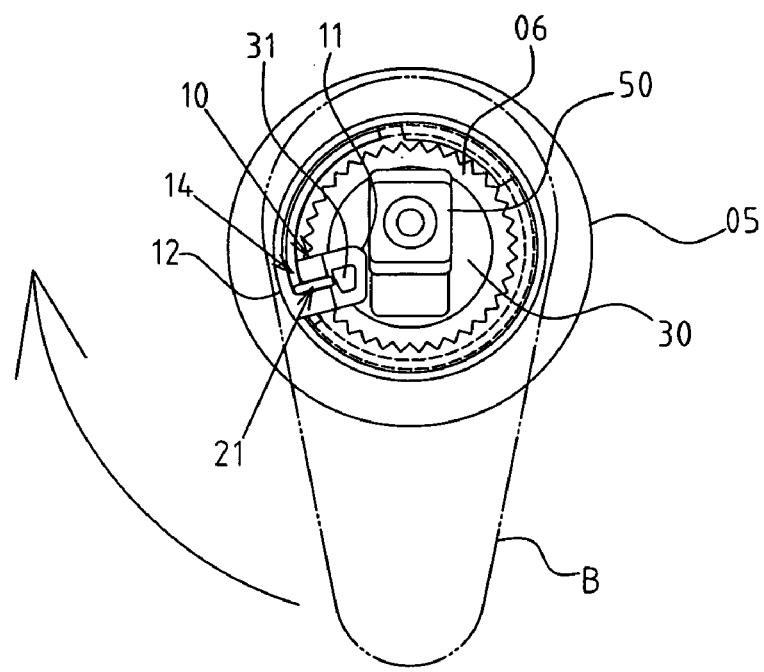
FIGS. 4-5 show horizontal cross-sectional views of the action state of the present invention from the top.
Figure 5:
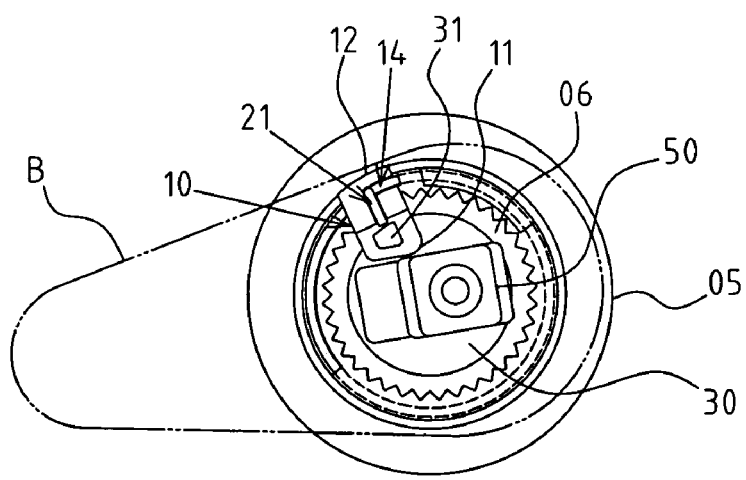

FIG. 4 shows the position of the valve stem 50 and valve stem base 30 when unturned after completion of the action component 10. The direction is indicated by the broken line. FIG. 5 shows the position of the valve stem 50 and valve stem base 30 as they are turned to the hot water. The action component 10 will turn with the connecting part 31 of the valve stem base 30, which in turn pushes the action end 21 of the elastic component 20 by the positioning slot 14, and exerts stress upon the elastic component 20.

As the valve stem 50 turns from the position of cold-water to that of the hot water, the lower control valve 60 and the upper control valve 71 will be pushed away from the central position. The air-proof state between the upper control valve 71 and the lower control valve 60 is achieved with lubricant. As the frictional force is greater than the elastic force, the hot water position will be maintained. As the faucet is turned off, the valve stem 50 will resume a vertical state and the elastic force of the elastic component will be released and bring the valve stem back to the cold-water position.

I claim:

1. A faucet having a faucet body and a valve base, said faucet comprising:

a cold-water resuming structure, being placed at a top of the faucet body and being comprised of an action component and an elastic component, said action component connected with the elastic component via a connecting part on the valve base, which is fitted in a bore on a holder at the top of the faucet body, said action component being a block forming a inner connecting end and an outer connecting end, said inner connecting end having a fitting part, said fitting part connecting with a connecting part of the valve stem base, said outer connecting end having a positioning slot, being fittable into an action end of the elastic component.

2. The faucet, defined in claim 1, wherein the valve stem base is comprised of a bulging pole, being fit with the fitting part of the inner connecting end of the action component.

3. The faucet, defined in claim 1, wherein the connecting part of the valve stem base and the fitting part of the action component are directionally matched, making the action component fixed.

4. The faucet, defined in claim 1, wherein the positioning slot on the outer connecting end of the action component has a slot part and an insert part; wherein the slot part is horizontally cut on the action component, and the insert part is set at the top of the action component and connected with the slot part at one end; wherein the action end of the elastic component is in the shape of reverse L, with a vertical section and a horizontal section; and wherein the vertical section fits into the slot part of the positioning slot while the horizontal section fits into the insert part of the positioning slot of the action component.

* * * * *